United States Patent Office 3,476,816
Patented Nov. 4, 1969

3,476,816
VINYLCYCLOHEXENOLS
William J. Farrissey, Jr., Northford, Conn., assignor to Esso Research and Engineering Company
No Drawing. Continuation-in-part of application Ser. No. 186,858, Apr. 12, 1962. This application Sept. 23, 1966, Ser. No. 581,439
Int. Cl. C07c 35/18
U.S. Cl. 260—617          1 Claim

ABSTRACT OF THE DISCLOSURE

In the oxidation of 4-vinylcyclohexene, a mixture of 4-hydroperoxides are formed which upon decomposition yield the novel alcohols 4-vinylcyclohexen-3-ol, 4-vinylcyclohexen-6-ol, and 3-vinylcyclohexen-6-ol. The secondarily unsaturated cyclic alcohols may be oxidized to the corresponding ketones which may be dehydrogenated to the corresponding vinyl or ethyl phenols.

---

This application is a continuation-in-part of Ser. No. 186,858, entitled "Oxygenated Compounds," filed Apr. 12, 1962, now abandoned.

The present invention deals with new compositions of matter and the methods for preparing the same. More particularly, the invention is directed to the air oxidation of 4-vinylcyclohexene producing a mixture of hydroperoxides which may be converted to the following novel compounds: 4-vinylcyclohexen-3-ol; 4-vinylcyclohexen-6-ol; 3-vinyylcyclohexen-6-ol; 4-vinylcyclohexen-3-one; 4-vinylcyclohexen-6-one; and 3-vinylcyclohexen-6-one.

The hydroperoxides of the present invention are prepared by the uncatalyzed low-temperature reaction of molecular oxygen with 4-vinylcyclohexene. In general the reaction is carried out by passing air or molecular oxygen through the 4-vinylcyclohexene, which may be dissolved in a solvent if desired. The oxidation is carried out at temperatures within the range of about 25° C. to about 90° C. Preferred temperatures are within the range of about 60° C. to about 75° C. The reaction is carried out for a period of about 2 to about 24 hours. Preferably the reaction is carried out in about 4 to about 6 hours.

The hydroperoxides of the present invention are recovered from the oxidation products of 4-vinylcyclohexene by extraction with an aqueous solution of an alkali metal hydroxide or by evaporatively distilling the product. The hydroperoxides may also be obtained from the oxidation products, which other than the hydroperoxides is primarily unreacted 4-vinylcyclohexene, by the removal of the unreacted olefin by a low-temperature vacuum evaporation. The preferred recovery of the hydroperoxides according to the present invention is to first treat or contact the reaction products with an aqueous solution of sodium carbonate, sodium bicarbonate or the like to remove any acids present and then to treat or contact the resulting oil phase with an aqueous solution of an alkali metal hydroxide. The caustic solution is preferably sodium hydroxide; however, potassium or lithium hydroxide may be used. The caustic treatment is carried out at temperatures within the range of about —5° C. to about 0° C. A mixture of the hydroperoxides of the present invention may also be obtained by evaporatively distilling the oxidation products of 4-vinylcyclohexene wherein the temperature of the liquid oxidation products does not exceed 50° C. and the pressure is maintained in the range of about 0.03 mm. to about 0.1 mm. An effective recovery of the hydroperoxides of the present invention may further be accomplished by the removal of the unreacted 4-vinylcyclohexene by a low-temperature vacuum evaporation. The evaporation is carried out at a temperature within the range of about 25° C. to about 30° C. and at a pressure within the range of about 5 to about 0.1 mm. In each instance, the mixture of hydroperoxides recovered comprises the following:

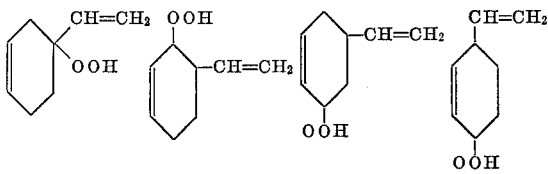

| I | II | III | IV |
|---|---|---|---|
| 9–13% | 8–14% | 57–66% | 15–19% |

4-hydroperoxy-4-vinylcyclohexene (I); 3-hydroperoxy-4-vinylcyclohexene (II); 6-hydroperoxy-4-vinylcyclohexene (III); and 6-hydroperoxy-3-vinylcyclohexene (IV). The substantial amount of (III) proves that 4-vinylcyclohexene oxidizes predominately at the meta or 6 position.

The oxidation of 4-vinylcyclohexene to form a mixture of hydroperoxides is unexpected and unobvious with respect to the prior art as exemplified by U.S. Patents 2,954,406 and 2,987,556 to W. F. Brill. According to the teachings of the Brill patents, only a single hydroperoxide is obtained from the oxidation of 4-vinylcyclohexene, which Brill discloses as "4-vinylcyclohexene hydroperoxide." Further, according to the teachings of U.S. Patent 2,987,556, Brill discloses that the decomposition of "4-vinylcyclohexene hydroperoxide" by heating or by catalytic or sulfite reduction would yield "1-vinyl-3-cyclohexenol." The structural formula set forth in the Brill patents for "4-vinylcyclohexene hydroperoxide" and "1-vinyl-3-cyclohexenol" are the following:

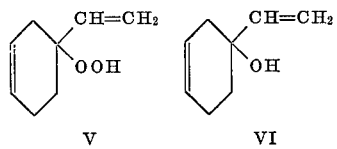

V            VI

It is to be noted that (V) above corresponds exactly with (I) set forth hereinabove.

According to the present invention, it was found that the oxidation of 4-vinylcyclohexene produced not a single hydroperoxide but a mixture of four hydroperoxides. It was further found that the oxidation took place predominantly at the 6 position. More importantly, it was found that three secondary hydroperoxides were formed by the air oxidation of 4-vinylcyclohexene which had properties distinct from the other hydroperoxide formed in the oxidation. The presence of four hydroperoxides, of which three were secondary, was verified by a nuclear magnetic resonance (NMR) spectrum analysis which indicated that 87% of the carbons having the hydroperoxides attached thereto also had a hydrogen linkage.

The hydroperoxides of the present invention are valuable intermediates for the production of the corresponding unsaturated cyclic alcohols. The hydroperoxide mixture is reacted with a reducing agent, such as, sodium bisulfite, sodium sulfite, triethyl phosphite, triphenyl phosphine, or the like. The hydroperoxides are added to an aqueous solution of the reducing agent and the reaction takes place at room temperature. The resulting products are a mixture of the corresponding alcohols having the following structural formula:

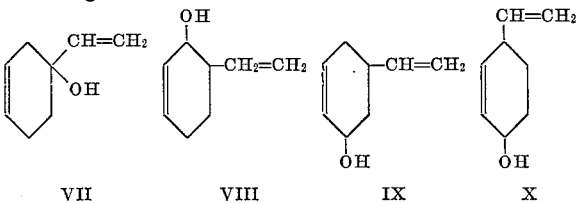

VII        VIII        IX        X

The alcohols produced are 4-vinylcyclohexen-4-ol (VII); 4-vinylcyclohexen-3-ol (VIII); 4-vinylcyclohexen-6-ol (IX); and 3-vinylcyclohexen-6-ol (X), respectively. The secondary unsaturated cyclic alcohols are useful as monomers for polymerization reactions since they possess both the fuctional vinyl and hydroxyl groups.

The secondary unsaturated alcohols can be converted to the corresponding ketones by Oppenauer oxidation as described in Organic Synthesis, coll. vol. IV, p. 192, which is specific for secondary alcohols. The tertiary alcohol portion of the mixture remains unchanged.

The secondary hydroperoxides of the present invention are capable of reacting to form products which are unobtainable with the tertiary 4-hydroperoxy-4-vinylcyclohexene. The cyclic ketones corresponding to the secondary hydroperoxides may be produced by reacting the same in the presence of ferrous ions. The conversion of the secondary hydroperoxides takes place by mixing them with an aqueous solution of ferrous sulfate and the like at room temperature. The cyclic ketones produced have the following structural formula:

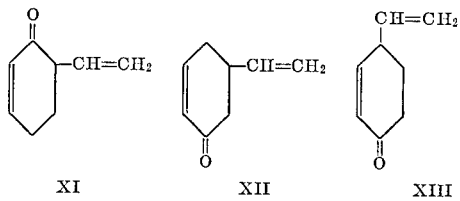

XI      XII      XIII 4-vinylcyclohexen-3-one (XI); 4-vinylcyclohexen-6-one (XII); and 3-vinylcyclohexen-6-one (XIII). The cyclic ketone corresponding to 4-hydroperoxy-4-vinylcyclohexene cannot be produced, but when mixed in the presence of a ferrous ion would probably give an acyclic product as follows:

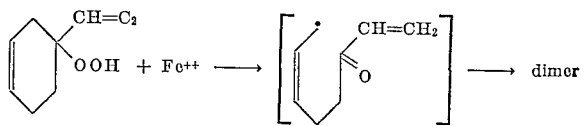

The unsaturated cyclic ketones are capable of producing numerous products; for example, they may be dehydrogenated or rearranged to produce the corresopnding vinyl phenols or ethyl phenols, respectively.

The invention will be further illustrated by the follow ing specific examples which are given by way of illustration and not as limitations on the scope of the invention.

EXAMPLE I 166.4 gm. (200 ml.) of pure 4-vinylcyclohexene was charged to a reactor. The reactor was fitted with a high-speed mixer. While thoroughly mixing, 4.22 liters of oxygen (S.T.P.) were bubbled through the 4-vinylcyclohexene. The reaction was carried out at 60° C. for 650 minutes. A 54% yield of hydroperoxides, based on the oxygen charged, was obtained. After cooling to 60° C. with ice, the reaction mixture was contacted with 100 ml. of a 5% solution of sodium carbonate to remove the acids and the resulting oil phase treated with cold 1 N sodium hydroxide. The mixture of hydroperoxides obtained was hydrogenated in ethanol solution with prereduced platinum oxide as catalyst. The alcohol mixture was charged to a GLPC column wherein the eluted fractions trapped in Dry Ice indicated that the hydroperoxides had been formed in the following amounts: 12.5% (I); 14.5% (II); 57.1% (III); and 16.4% (IV).

EXAMPLE II

Following the procedure of Example I, 166.4 gm. (200 ml. of 4-vinylcyclohexene was charged to the reactor. The reaction was carried out at 75° C. for a period of 195 minutes. The yield was approximately the same as in Example I. After workup, the analysis based on the ethylcyclohexanols indicated that the hydroperoxides had been formed in the following amounts: 8.9% (I); 7.9% (II); 66.7% (III); and 16.5% (IV).

EXAMPLE III 83.2 gm. (100 ml.) of 4-vinylcyclohexene was charged to the reactor along with 100 ml. of t-butyl benzene. While mixing thoroughly with a high-speed mixer, 3.2 liters of oxygen (S.T.P.) were bubbled through the mixture. The reaction was carried out at 75° C. for 460 minutes. An analysis of the ethylcyclohexanol mixture indicated that the hydroperoxides were formed in the following amounts: 10.3% (I); 7.9% (II); 66.2% (III); and 15.7% (IV).

EXAMPLE IV

The hydroperoxide (1.4 g.) was reduced with 10 ml. of 25% sodium sulfite solution at 0° for 1 hr. and room temperature for 1 hr. The product (1.25 g.) was isolated by extraction of the reaction mixture with ether. The infrared and nuclear magnetic resonance spectra were indicative of unsaturated alcohols.

EXAMPLE V

To a mixture of 2.8 g. of ferrous sulfate in 20 ml. of water was added 1.4 g. of the hydroperoxide of Example I at 0–25° C. A copious brown precipitate of ferric hydroxide forms immediately. After 1 hr. at room temperature the mixture was extracted with ether to give, as shown by IR and NMR, a mixture of the α,β-unsaturated ketones, 4-vinylcyclohexen-3-one, 4-vinylcyclohexen-6-one, and 3-vinylcyclohexen-6-one, B.P. 40–43° at 1 mm., in approximately the same amounts as the corresponding starting material. A 2,4-dinitrophenyl hydrazone derivative of the ketone mixture was prepared, M.P. 137–144°; molecular weight by mass spectrography 302; theory 302.

The nature and objects of the present invention having been completely described and illustrated and the best mode thereof set forth, what I wish to claim as new and useful and secure by Letters Patent is:

1. An alcohol selected from the group consisting of 4-vinylcyclohexen-3-ol, 4-vinylcyclohexen-6-ol, and 3-vinylcyclohexen-6-ol.

References Cited

Slawinski et al., "Chem. Abst.," vol. 29, col. 6225[9] (1935).

LEON ZITVER, Primary Examiner

MATTHEW M. JACOB, Assistant Examiner

U.S. Cl. X.R.

260—586, 610, 621